United States Patent
Acena et al.

(10) Patent No.: US 7,573,151 B2
(45) Date of Patent: Aug. 11, 2009

(54) DUAL ENERGY-STORAGE FOR A VEHICLE SYSTEM

(75) Inventors: Miguel Angel Acena, Valls (ES); Jordi Escoda, Valls (ES)

(73) Assignee: Lear Corporation, Southfield, MI (US)

( * ) Notice: Subject to any disclaimer, the term of this patent is extended or adjusted under 35 U.S.C. 154(b) by 50 days.

(21) Appl. No.: 11/870,753

(22) Filed: Oct. 11, 2007

(65) Prior Publication Data
US 2009/0096285 A1    Apr. 16, 2009

(51) Int. Cl.
    *B60L 1/00*    (2006.01)
(52) U.S. Cl. ........................................ 307/9.1
(58) Field of Classification Search .................. 307/9.1
    See application file for complete search history.

(56) References Cited

U.S. PATENT DOCUMENTS

| | | | |
|---|---|---|---|
| 4,723,079 A | 2/1988 | Norton | |
| 5,146,095 A | 9/1992 | Tsuchiya et al. | |
| 5,155,373 A | 10/1992 | Tsuchiya et al. | |
| 5,155,374 A | 10/1992 | Shirata et al. | |
| 5,157,267 A | 10/1992 | Shirata et al. | |
| 5,207,194 A | 5/1993 | Clerici | |
| 5,260,637 A | 11/1993 | Pizzi | |
| 5,285,862 A | 2/1994 | Furutani et al. | |
| 5,642,696 A | 7/1997 | Matsui | |
| 5,796,175 A | 8/1998 | Itoh et al. | |
| 5,925,938 A | 7/1999 | Tamor | |
| 5,998,884 A | 12/1999 | Kitamine et al. | |
| 6,075,331 A | 6/2000 | Ando et al. | |
| 6,304,056 B1 | 10/2001 | Gale et al. | |
| 6,325,035 B1 | 12/2001 | Codina et al. | |
| 6,371,067 B1 | 4/2002 | Schmitz et al. | |
| 6,426,606 B1 | 7/2002 | Purkey | |
| 6,497,209 B1 | 12/2002 | Karuppana et al. | |
| 6,717,291 B2 | 4/2004 | Purkey | |
| 6,819,010 B2 | 11/2004 | Burke | |
| 6,871,625 B1 | 3/2005 | Burke | |
| 6,888,266 B2 | 5/2005 | Burke et al. | |
| 6,988,475 B2 | 1/2006 | Burke | |
| 7,030,511 B2 | 4/2006 | Zarei | |
| 7,095,135 B2 | 8/2006 | Purkey et al. | |
| 7,147,072 B2 | 12/2006 | Botti | |
| 7,160,225 B2 | 1/2007 | Berger et al. | |
| 2005/0273225 A1 | 12/2005 | Brigham et al. | |
| 2006/0186738 A1 | 8/2006 | Noguchi et al. | |
| 2006/0214427 A1 | 9/2006 | Xu et al. | |
| 2007/0078039 A1 | 4/2007 | Antony et al. | |
| 2007/0099749 A1 | 5/2007 | Zillmer et al. | |

*Primary Examiner*—Robert L. Deberadinis
(74) *Attorney, Agent, or Firm*—Brooks Kushman P.C.

(57) ABSTRACT

A switching control unit for the controlling the transfer of electrical power in a vehicle from at least one of a starter generator and a supercapacitor bank to/from at least one of a service battery and a plurality of electrical devices is provided. A switching device selectively connects/disconnects the at least one of the starter generator and the supercapacitor bank to/from the at least one of the service battery and the plurality of electrical devices. A switch controller is adapted to measure a voltage across the supercapacitor bank to generate a bank voltage signal, to measure a voltage across the service battery to generate a service voltage signal, and to control the switching device to connect/disconnect the at least one of the starter generator and the supercapacitor bank to/from the at least one of the service battery and the plurality of electrical devices in response to the voltage signals.

20 Claims, 2 Drawing Sheets

DUAL ENERGY-STORAGE FOR A VEHICLE SYSTEM

BACKGROUND

1. Technical Field

The embodiments described herein generally relate to a dual energy-storage for a vehicle system.

2. Background Art

Conventional micro/mild hybrid vehicles each include a starter-generator unit and a conventional 14 Volt electrical architecture. The hybrid vehicle is also equipped with a plurality of energy-storage devices. For example, the energy storage devices may include a plurality of batteries and a supercapacitor bank. With such a configuration, the vehicles can efficiently handle the electrical-energy flow to and from the energy storage devices and provide stop-start, regenerative braking and power boost functionality in order to reduce average fuel consumption and $CO_2$ emissions. The conventional method for interfacing with the energy-storage devices includes implementing a combination of relays or a DC/DC converter. The relays allow for the transmission/consumption of energy to/from a starter generator. The relays transmit/receive power to/from different power nets in the vehicle. Each power net is connected to an energy storage device via a separate relay. Such a configuration may only support engine stop-start functionality.

The DC/DC converter is a more flexible solution since the DC/DC converter provides a seamless permanent interface between the two energy storage devices (e.g., the battery and the supercapacitor bank). In addition, the DC/DC converter can adapt voltage differences from each side of the DC/DC converter and operate bidirectionally. The DC/DC converter solution makes it possible not only to perform the stop-start function but the DC/DC converter also allows the vehicle to perform regenerative braking and support power boost features. While the DC/DC converter is useful, the DC/DC converter is complex-to-manufacture and may require an expensive electronic unit to control the operation of the DC/DC converter.

The typical DC/DC converter for the aforementioned application is a bidirectional 12-to-12 volt stabilizer which is able to handle different voltage ranges at the input and output of the DC/DC converter. The DC/DC converters are usually designed with a power-electronics topology that uses power semiconductors along with drivers, magnetic components (which include transformers or inductors) and a controller board.

Accordingly, it would be desirable to implement a simple interface between energy storage devices in a hybrid vehicle. It would also be desirable to provide a controller device that may be less complex and inexpensive to implement than the conventional DC/DC converters as implemented in hybrid vehicles.

SUMMARY

In one embodiment, a switching control unit for the controlling the transfer of electrical power in a vehicle from at least one of a starter generator and a supercapacitor bank to/from at least one of a service battery and a plurality of electrical devices is provided. A switching device selectively connects/disconnects the at least one of the starter generator and the supercapacitor bank to/from the at least one of the service battery and the plurality of electrical devices. A switch controller is adapted to measure a voltage across the supercapacitor bank to generate a bank voltage signal, to measure a voltage across the service battery to generate a service voltage signal, and to control the switching device to connect/disconnect the at least one of the starter generator and the supercapacitor bank to/from the at least one of the service battery and the plurality of electrical devices in response to the voltage signals.

In another embodiment, a method for controlling the transfer of electrical power in a hybrid electrical vehicle from at least one of a starter generator and a supercapacitor bank to at least one of a service battery and a plurality of electrical devices is provided. The method comprises selectively coupling/decoupling the at least one of the starter generator and the supercapacitor bank to/from the at least one of the service battery and the plurality of electrical devices and measuring a voltage across the supercapacitor bank to generate a bank voltage signal. The method further comprises measuring a voltage across the service battery to generate a service voltage signal and controlling the connecting/disconnecting of the at least one of the starter generator and the supercapacitor bank to/from the at least one of the service battery and the plurality of electrical devices in response to the bank voltage signal and the service voltage signal.

In yet another embodiment, a switching control unit for the controlling the transfer of electrical power in a hybrid electrical vehicle from at least one of a starter generator and a supercapacitor bank to at least one of a service battery and a plurality of electrical devices is provided. A switching device is adapted to selectively connect/disconnect the at least one of the starter generator and the supercapacitor bank to the at least one of the service battery and the plurality of electrical devices. A switch controller is adapted to measure a voltage across the supercapacitor bank to generate a bank voltage signal, measure a voltage across the service battery to generate a service voltage signal, and control the switching device to connect the at least one of the starter generator and the supercapacitor bank to the at least one of the service battery and the plurality of electrical devices in response to determining that the bank voltage signal is equal to the service voltage signal.

BRIEF DESCRIPTION OF THE DRAWINGS

The present invention is pointed out with particularity in the appended claims. However, other features of the present invention will become more apparent and the embodiments of the present invention will be best understood by referring to the following detailed description in conjunction with the accompany drawings in which:

DETAILED DESCRIPTION OF THE PREFERRED EMBODIMENT(S)

Figure 1:
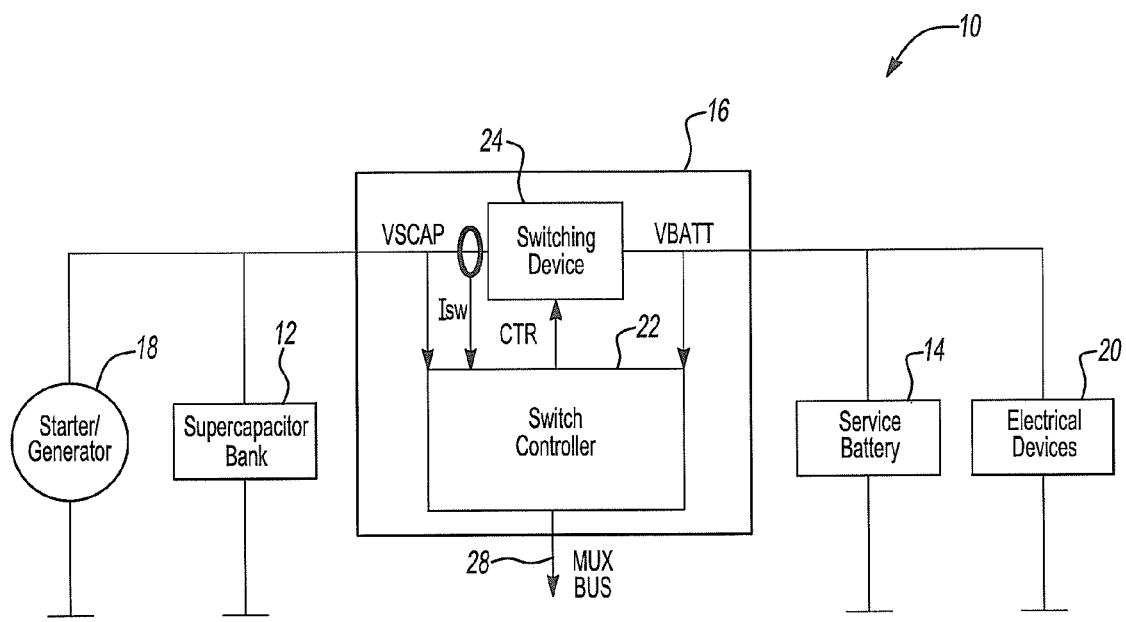
FIG. 1 depicts a dual energy-storage system for a vehicle.

FIG. 1 illustrates a vehicle storage system 10 for use in a vehicle. The vehicle may be a hybrid electric vehicle (HEV). The HEV may be a micro or mild hybrid vehicle. The system 10 includes a supercapacitor bank 12 and a service battery 14. The supercapacitor bank 12 may be implemented with a plurality of ultracapacitors or electrochemical double layer capacitors (ELDCs). A switching control unit 16 is operably coupled between the supercapacitor bank 12 and the service battery 14. The switching control unit 16 is configured to selectively connect/disconnect the supercapacitor bank 12 to/from the service battery 14 while the vehicle undergoes various operating modes.

A starter generator 18 is coupled to the supercapacitor bank 12 and the switching control unit 16. The starter generator 18 may be implemented as an electrical machine that is configured to start an engine (not shown) or generate electrical power for the vehicle after the engine is started. Electrical devices 20 are coupled to the switching control unit 16 and the service battery 14. The electrical devices 20 may be selectively connected to the supercapacitor bank 12 via the switching control unit 16. The electric devices 20 may include, but is not limited to devices used in connection with air conditioning, heating and cooling, entertainment systems, and/or lighting systems.

In general, the system 10 (the supercapacitor bank 12 and/or the service battery 14) is configured to store energy to crank the engine. The system 10 is further configured to supply power for the electrical devices 20 when the engine is not running. The switching control unit 16 includes a switch controller 22 and switching device 24. The controller 22 generates a control signal CTR to open or close the switching device 24. The switching device 24 may operably couple the supercapacitor bank 12 to the service battery 14 at predetermined vehicle operating modes in response to the signal CTR. The switch controller 22 is coupled to a vehicle multiplex (MUX) bus 28 which serves as an interface to other controllers (not shown) disposed throughout the vehicle. The bus 28 may facilitate communication between the switch controller 22 and a diagnostic tool (not shown) to test and/or diagnose the controller 22. A plurality of vehicle controllers (not shown) may transmit signals over the bus 28 to the switch controller 22. The switch controller 22 may transmit messages over the bus 28 to the vehicle controllers. Such messages may include the status of the switching device 24 (e.g., open/closed) and/or various system failure signals detected by the switch controller 22. The types of messages transmitted/received over the bus 28 will be discussed in more detail in connection with FIG. 2.

The bus 28 may comprise a medium or high speed Controller Area Network (CAN) bus or a local interconnect network (LIN) bus. Other such suitable multiplex buses may also be used. The particular type of bus used may vary based on the desired criteria of a particular implementation. The switching device 24 may be implemented as, but not limited to, a relay, a stand alone contact-based switch, or a silicon switching device (e.g., MOSFET or insulated-gate bipolar transistor (IGBT)). The particular type of switching device 24 used may vary based on the desired criteria of a particular implementation.

The supercapacitor bank 12 is adapted to transfer electrical power to the starter generator 18 during vehicle start-up to crank the engine. In addition, the supercapacitor bank 12 provides for a power boost for the starter generator 18 by transferring electrical power to the starter generator 18 when the vehicle is running in a hybrid mode (e.g., vehicle is driving with mechanical assist (or power) from the engine). The power boost mode may be defined as the state in which the starter generator 18 draws power from the supercapacitor bank 12 to drive the vehicle while simultaneously driving the vehicle with mechanical assist provided by the engine. The starter generator 18 may draw power from the supercapacitor bank 12 when the vehicle is driven with a mechanical assist by the engine. The starter generator 18 transfers electrical power to the supercapacitor bank 12 for charging the supercapacitor bank 12 after the engine is started and for capturing electrical power from the vehicle (e.g., while the vehicle performs regenerative braking after a power-boost cycle).

The supercapacitor bank 12 provides electrical power to the starter generator 18 not only after starting the vehicle for the first time, but while the vehicle performs an engine stop-start function. The engine stop-start function is defined as the process in which the starter generator 18 turns off the engine in response to a determination made by an engine controller (not shown) that the vehicle has come to a complete stop. The supercapacitor 12 provides power to the starter generator 18 to start the engine when it is desired for the vehicle to move again (e.g., vehicle to come out of halt in traffic). The starter generator 18 charges the supercapacitor bank 12 after the engine is started and while the vehicle moves.

In general, the switching device 24 opens when the supercapacitor bank 12 transmits/receives electrical power to/from the starter generator 18. While the switching device 24 is open, the supercapacitor bank 12 transmits/receives electrical power to/from the starter generator 18, and the electrical devices 20 may consume electrical power from the service battery 14. The voltage across the supercapacitor bank 12 corresponds to a voltage VSCAP. The voltage across the service battery 14 corresponds to a voltage VBAT. The switch controller 72 opens or closes the switching device 24 based on VSCAP and VBAT.

The switching device 24 is adapted to disconnect the supercapacitor bank 12 from the service battery 14 when VSCAP is substantially different from VBAT. Such a condition may prevent the switching device 24 from being damaged due to large equalization pulses. The large equalization pulses are due to the voltage differential between the supercapacitor bank 12 and the service battery 14.

The switch controller 22 is adapted to close the switching device 24 in response to detecting that VSCAP and VBAT are equalized (e.g., voltage of the supercapacitor bank 12 is close to or equal to the voltage of the service battery 24). In the equalized state, the starter generator 18 provides electrical power to the electrical devices 20 and charges both the supercapacitor bank 12 and the service battery 14. The supercapacitor bank 12 and the service battery 14 may clamp the electrical power (voltage) generated by the starter generator 18 while the system 10 is in the equalized state. The supercapacitor bank 12 acts as a network stabilizer by compensating for sudden load variations in the event two or more of the electrical devices 20 are turned on or off at the same time, or the service battery 14 is inadvertently disconnected from the system 10.

The switch controller 22 may protect the electrical devices 20 from undesired load dumps in the event the supercapacitor bank 12 is disconnected when charging electrical power from the starter generator 18. The switch controller 22 is generally adapted to disconnect the supercapacitor bank 12 from the service battery 14 and the electrical devices 20 with the switching device 24 in response to detecting that the current supplied by the starter generator 18 is high. By disconnecting the supercapacitor bank 12 from the service battery 14 and the electrical devices 20 in response to detecting a high amount of current, the electrical devices 20 are protected from receiving a high amount of current from the starter generator 18.

In general, the system 10 provides load dump protection for the electrical devices 20 by isolating the starter generator 18 from the service battery 14 and the electrical devices 20 in response to the switch controller 22 detecting a large amount of current from the starter generator 18. If the supercapacitor bank 12 is receiving electrical power from the starter generator 18 and the supercapacitor bank 12 suddenly disconnects from the starter generator 18, the switching device 24 opens, thereby isolating the electrical devices 20 from a potential load dump generated by the starter generator 18. If, on the other hand, the supercapacitor bank 12 is providing power to the service battery 14 and/or the electrical devices 20 when the system 10 is in the equalized state, and the battery 14 is suddenly disconnected from the system 10, the supercapacitor bank 12 is adapted to absorb the load variation created due to the battery disconnect and protect the electrical devices 20 from voltage variation.

Figure 2:
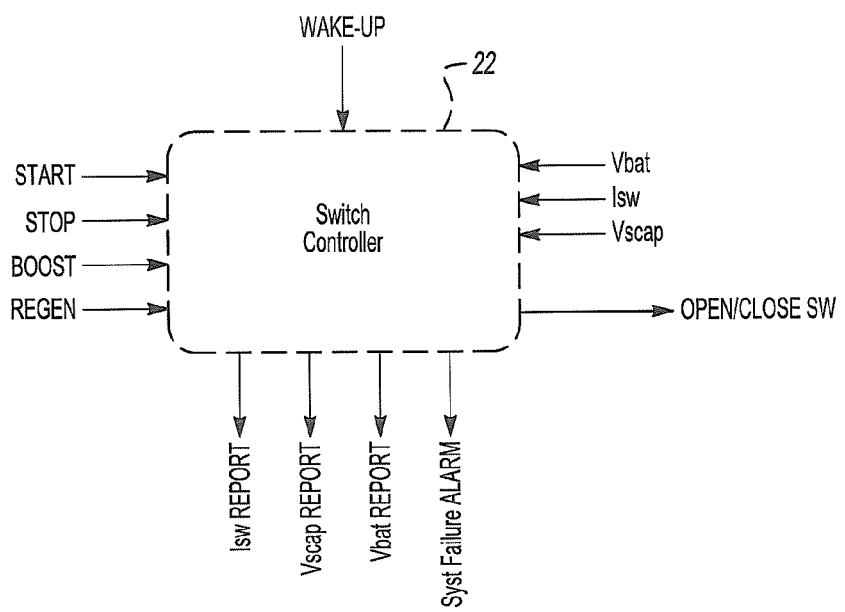
FIG. 2 depicts a diagram illustrating various inputs and outputs transmitted from the switching control unit.

FIG. 2 depicts a diagram illustrating various signal inputs and outputs that are transmitted/received to and from the switching control unit 16. The switch controller 22 is adapted to transmit/receive a plurality of multiplexed based messages over the bus 28. For example, the engine control unit (ECU) or other similar controller may transmit signals START and STOP. The signal START generally corresponds to the vehicle state in which the engine of the vehicle is being started. The signal STOP generally corresponds to the vehicle state whereby the vehicle is at a complete stop. An interior body electronics controller or other similar controller in the vehicle may transmit a signal WAKE_UP over the bus 28 to the switch controller 22. The signal WAKE_UP is used to wake up one or more controllers on the bus 28. The keys may or may not be in the ignition when the signal WAKE_UP is transmitted. The engine controller or other controller within the vehicle may transmit a signal BOOST. The signal BOOST generally corresponds to the vehicle state in which the starter generator 18 is consuming electrical power from the supercapacitor bank 12 to drive the vehicle. In such a state, the engine also provides a mechanical assist to drive the vehicle while the starter generator 18 consumes electrical power.

A starter generator controller or other such suitable controller in the vehicle may transmit a signal REGEN to the switch controller 22. The signal REGEN generally corresponds to the vehicle state in which the vehicle may be storing electrical power while performing regenerative braking. The starter generator 18 either generates electrical power during the braking event to be stored in the supercapacitors bank 12, or supplies electrical power to the electrical device 20 in the vehicle. The starter generator 18 draws electrical power from the supercapacitor bank 12 during a vehicle cranking mode or while in the boost state.

The switch controller 22 may measure the voltage across the supercapacitor bank 12 (e.g., VSCAP) and transmit a signal VSCAP_REPORT over the bus 28 to various controllers in the vehicle that may to use the signal VSCAP_REPORT to perform a particular function. In addition, the switch controller 22 may also measure the voltage (e.g., VBAT) across the service battery 14 and transmit a signal VBAT_REPORT over the bus 28 to various controllers in the vehicle that may use the signal VBAT_REPORT to perform a particular function. The switch controller 22 may also measure the current (e.g., ISW) across the switching device 24 and transmit a signal ISW_REPORT over the bus 28 to various controllers in the vehicle that may use the signal ISW_REPORT to perform a particular function. The signals VSCAP_REPORT, VSCAP_REPORT, and ISW_REPORT generally correspond to the respective voltage and current values for the supercapacitor bank 12, the service battery 14 and the switching device 24. The switch controller 22 is adapted to provide the state of the switching device 24 (e.g., open/close) and transmit the state of the switch device 24 as a signal SW_STATUS. The switch controller 22 transmits the signal SW_STATUS on the bus 28 to various controllers in the vehicle that may use the signal SW_STATUS to perform a particular function. The switch controller 22 may also detect system failures and transmit a signal SYS_FAILURE over the bus 28 to various controllers in the vehicle that may use the signal SYS_FAILURE to perform a particular function.

The switch controller 22 may be implemented to transmit/receive one or more of the signals as illustrated in FIG. 2 over the bus 28 as hardwired signals and/or multiplexed messages. The particular type of communication mechanism used in the system 10 (e.g., MUX-based or hardwire based) may vary based on the desired criteria of a particular implementation.

Figure 3:
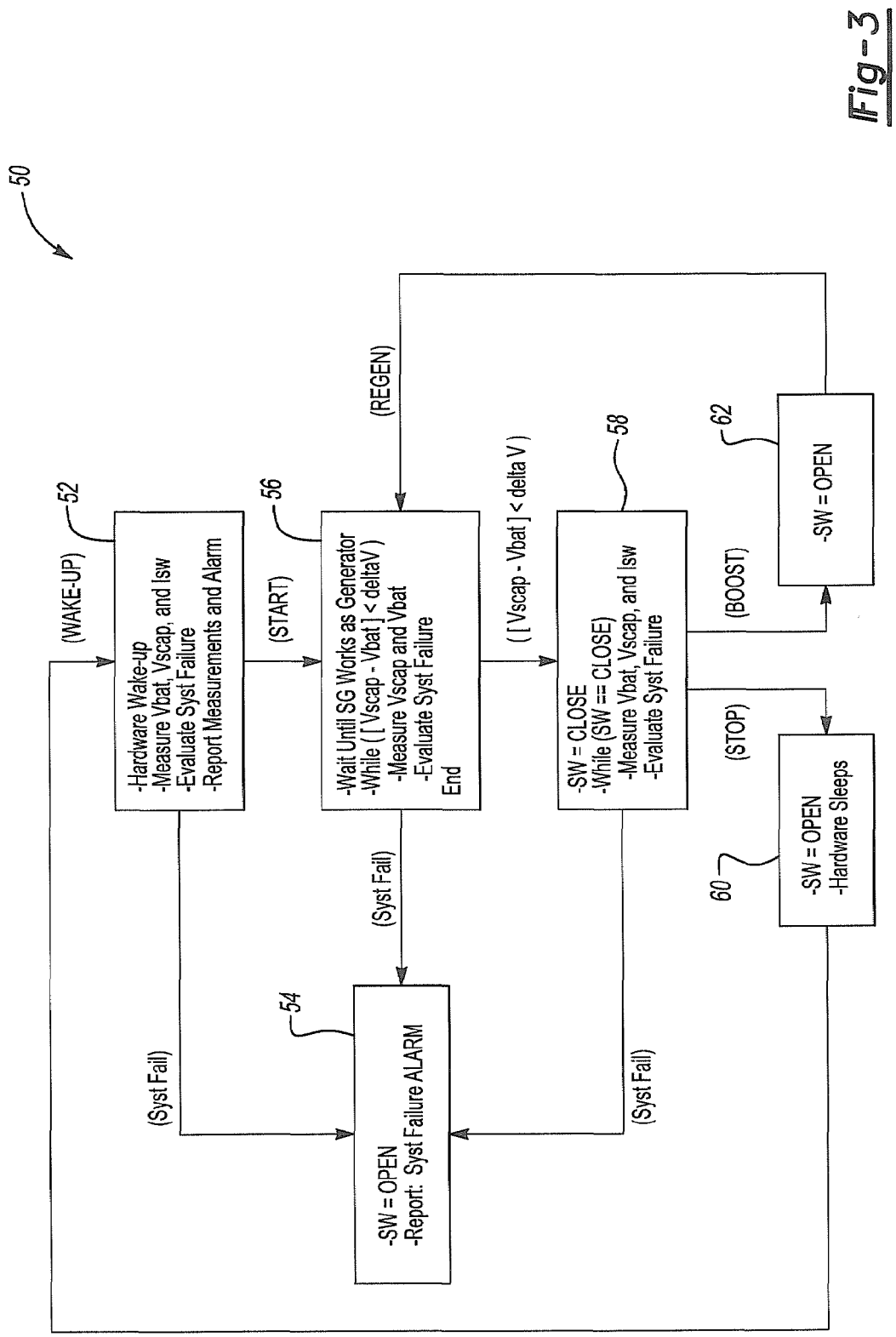
FIG. 3 depicts a state diagram for switching electrical power in a dual storage system in the vehicle.

FIG. 3 depicts a state diagram 50 for switching electrical power in the system 10 in accordance to one embodiment of the present invention. In state 52, the switch controller 22 receives the signal WAKE_UP over the bus 28. The switch controller 22 enters into an operational mode in response to the signal WAKE_UP. In general, any controller coupled to the bus 28 may transmit the signal WAKE_UP. In one example, a vehicle controller may be adapted to transmit the signal WAKE_UP in response to detecting that the key was inserted in the ignition. In another example, a vehicle controller may transmit the signal WAKE_UP while the key is out of the ignition if the vehicle controller detects the occurrence of an event that is configured to wake up the bus 28. For example, a user may unlock a door with a key fob while the vehicle was in a sleep mode. In such a case, a security module sends a wake up message on the bus 28 in response to the user depressing the unlock button of the key fob. If the vehicle experiences a wake up event (e.g., open/close door, key fob input, light switch activation or other vehicle activation event) the corresponding controller which detects the wake up event may send the signal WAKE_UP on the bus thereby waking up all of the controllers on the bus 28. In one example, the vehicle may experience a wake up event while performing the stop-start function. For example, a wake up event may occur after the "stop" condition and before the "start" condition in the stop-start cycle.

In response to receiving the signal WAKE_UP, the switch controller 22 measures VBAT, VSCAP and ISW. The switch controller 22 determines if a system failure has occurred based on the measured values of VBAT, VSCAP and ISW. In general, an unexpected low value of VBAT or VSCAP, or a high ISW value generally correspond to a failure of either the switching device 24 or the other components coupled to the switching device 24 such as the supercapacitor bank 12, the service battery 14 or the electrical devices 20. In the case that VBAT or VSCAP is too low, or if ISW is high, the switch controller 22 may force the switching device 24 to open and report a failure condition over the MUX bus 28. Such a condition will be in connection with state 54. The switch control unit 16 transmits the signals ISW_REPORT, VSCAP_REPORT, and VBAT_REPORT to controllers over the bus 28 that are adapted to use such signals for a particular function. Any one of the controllers in the vehicle may request any one or more of the signals ISW_REPORT, VSCAP_REPORT, and VBAT_REPORT on demand.

If the switch controller 22 detects a system failure (e.g., a short circuit at the switching device 24), the diagram 50 moves to state 54. In the state 54, the switch controller 22 transmits the signal SYS_FAILURE over the bus 28 and places the switching device 24 in an open state. If the signal START is transmitted to the switch controller 22, the engine is started then the diagram 50 moves to state 56. While the engine is being started, the starter generator 18 draws electrical power from the supercapacitor bank 12 to crank the engine of the vehicle. In state 56, the starter generator 18 operates in a generator mode thereby generating electrical power after engine start up in response to mechanical energy produced from the engine. The starter generator 18 charges the supercapacitor bank 12 while in the generator mode. The switch controller 22 measures VSCAP across the supercapacitor bank 12 and VBAT across the service battery 14. The switch controller 22 determines a delta voltage (e.g., deltaV). The delta voltage may be a calibratible value and programmed in the switch controller 22. The particular value for the delta voltage may be varied based on the desired criteria of a particular implementation. The switch controller 22 uses deltaV, VSCAP and VBAT to determine when it may be necessary to close the switching device 20. The switch controller 22 may control the switching device 24 to close if the following condition is met:

$$(VSCAP-VBAT) < deltaV \tag{1}$$

If the condition of eq. 1 is met, such a condition is generally indicative that the voltage between the supercapacitor bank 12 and the service battery 14 is generally small enough to ensure that a high equalization current may not be present through the switching device 24. While in state 56, the switch controller 22 checks for a system failure. If the switch controller 22 determines a system failure based on the VSCAP, VBAT and ISW, then the diagram 50 moves back to state 54.

If the condition of eq. 1 is met, then the diagram 50 moves to state 58. In state 58, the switch controller 22 closes the switching device 20. While in the closed state, the supercapacitor bank 12 is configured to provide electrical power to the service battery 14 and the electrical devices 20. The electrical power may be stored on the service battery 14 and/or presented to the electrical devices 20 for consumption. The state 58 generally represents a typical operational mode for the vehicle while the engine is running. The state 58 corresponds to the vehicle being in the equalized state. The switch controller 22 continues to monitor for a system failure by monitoring VSCAP, VBAT and ISW. If the switch controller 22 detects a system failure based on VSCAP, VBAT and ISW, then the diagram 50 moves back to state 54. If the switch controller 22 receives the signal STOP (e.g., vehicle comes to a complete stop), then the diagram 50 moves to state 60.

In state 60, the switch controller 22 opens the switching device 20 so that the supercapacitor bank 12 is disconnected from the service battery 14. The switch controller 22 may enter into a sleep mode. While in the sleep mode, the switch controller 22 waits for the next signal WAKE_UP. The diagram 50 moves back to state 52 in response to the next signal WAKE_UP.

If the switch controller 22 receives the signal BOOST while in the state 58, then the diagram 50 moves to state 62. In state 62, the starter generator 18 draws power from the supercapacitor bank 12 to drive the engine along with any mechanical assist provided by the engine. The switch controller 22 opens the switching device 20 such that the supercapacitor bank 12 is disconnected from the service battery 14 and the electrical devices 20. By disconnecting the supercapacitor bank 12 from the service battery 14 and the electrical devices 20, VBAT may remain stable and the operation of the electrical devices 20 may not be affected while the diagram 50 is in state 62.

If the switch controller 22 receives the signal REGEN while in state 62, the diagram 50 moves back to state 56. The signal REGEN generally corresponds to the condition whereby the vehicle is in an electrical power-producing mode (e.g., via regenerative braking). In such a case, the switch controller 22 controls the switching device 24 to open. Electrical power is stored on the supercapacitor bank 12 while in the REGEN state.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A switching control unit for controlling the transfer of electrical power in a hybrid electrical vehicle from at least one of a starter generator and a supercapacitor bank to at least one of a service battery and a plurality of electrical devices, the switching control unit comprising:
    a switching device adapted to selectively connect/disconnect the at least one of the starter generator and the supercapacitor bank to/from the at least one of the service battery and the plurality of electrical devices; and
    a switch controller adapted to:
        measure a voltage across the supercapacitor bank to generate a bank voltage signal;
        measure a voltage across the service battery to generate a service voltage signal; and
        control the switching device to connect/disconnect the at least one of the starter generator and the supercapacitor bank to/from the at least one of the service battery and the plurality of electrical devices in response to the bank voltage signal and the service voltage signal.

2. The switching control unit of claim 1 wherein the switch controller is adapted to control the switching device to connect the at least one of the starter generator and the supercapacitor bank to the at least one of the service battery and the plurality of electrical devices in response to determining that an absolute value of the difference between the bank voltage signal and the service voltage signal is less than a delta voltage signal.

3. The switching control unit of claim 2 wherein the delta voltage signal is a programmable value stored in the switch controller.

4. The switching control unit of claim 2 wherein the switch controller is further adapted to control the switching device to connect the at least one of the starter generator and the supercapacitor bank to the at least one of the service battery and the plurality of electrical devices in response to determining that the vehicle has come out of an engine start up.

5. The switching control unit of claim 1 wherein the switch controller is further adapted to control the switching device to disconnect the at least one of the starter generator and the supercapacitor bank from the at least one of the service battery and the plurality of electrical devices in response to determining that an absolute value of the difference between the bank voltage signal and the service voltage signal is greater than the delta voltage signal.

6. The switching control unit of claim 1 wherein the switch controller is further adapted to measure the current across the switching device to generate a switch current signal and to report a system failure in the event the switch controller determines that the switch current signal indicates a short circuit condition across the switching device.

7. The switching control unit of claim 6 wherein the switch controller is further adapted to disconnect the at least one of the starter generator and the supercapacitor bank from the at least one of the service battery and the plurality of electrical devices by opening the switching device in the event the switch current signal corresponds to a short circuit condition across the switching device.

8. A method for controlling the transfer of electrical power in a hybrid electrical vehicle from at least one of a starter generator and a supercapacitor bank to at least one of a service battery and a plurality of electrical devices, the method comprising:

selectively coupling/decoupling the at least one of the starter generator and the supercapacitor bank to/from the at least one of the service battery and the plurality of electrical devices with a switching device;

measuring a voltage across the supercapacitor bank to generate a bank voltage signal;

measuring a voltage across the service battery to generate a service voltage signal; and controlling the switching device to connect/disconnect the at least one of the starter generator and the supercapacitor bank to/from the at least one of the service battery and the plurality of electrical devices in response to the bank voltage signal and the service voltage signal.

9. The method of claim 8 further comprising measuring a current across the switching device to generate a switch current signal.

10. The method of claim 9 wherein the measuring of voltage across the supercapacitor bank and the service battery and the measuring of the current across the switching device is performed when the vehicle experiences a wake up event.

11. The method of claim 10 further comprising controlling the switching device to disconnect the at least one of the starter generator and the supercapacitor bank from the at least one of the service battery and the plurality of electrical devices by opening the switch and reporting a system failure in the event at least one of the bank voltage signal and the service voltage signal is low or in the event the switch current signal is high.

12. The method of claim 10 further comprising controlling the switching device to connect the at least one of the starter generator and the supercapacitor bank to the at least one of the service battery and the plurality of electrical devices in response to determining that at least one of an absolute value of the difference between the bank voltage signal and the service voltage signal is less than a delta voltage signal and an engine of the vehicle is started.

13. The method of claim 12 further comprising controlling the switching device to disconnect the at least one of the starter generator and the supercapacitor bank from the at least one of the service battery and the plurality of electrical devices by opening the switching device in the event the engine of the vehicle stops.

14. The method of claim 12 further comprising controlling the switching device to disconnect the at least one of the starter generator and the supercapacitor bank from the at least one of the service battery and the plurality of electrical devices by opening the switching device in the event the vehicle undergoes a boost mode.

15. The method of claim 14 further comprising measuring the voltages across the supercapacitor bank and the service battery to determine if the at least one of the absolute value of the difference between the bank voltage signal and the service voltage signal is less than the delta voltage signal in response to the vehicle experiencing a regenerative braking mode.

16. A switching control unit for controlling the transfer of electrical power in a hybrid electrical vehicle from at least one of a starter generator and a supercapacitor bank to at least one of a service battery and a plurality of electrical devices, the switching control unit comprising:

a switching device adapted to selectively connect/disconnect the at least one of the starter generator and the supercapacitor bank to/from the at least one of the service battery and the plurality of electrical devices; and a switch controller adapted to:

measure a voltage across the supercapacitor bank to generate a bank voltage signal;

measure a voltage across the service battery to generate a service voltage signal; and control the switching device to connect the at least one of the starter generator and the supercapacitor bank to the at least one of the service battery and the plurality of electrical devices in response to determining that the bank voltage signal is close to or equal to the service voltage signal.

17. The switching control unit of claim 16 wherein the switch controller is further adapted to control the switching device to connect the at least one of the starter generator and the supercapacitor bank to the at least one of the service battery and the plurality of electrical devices in response to determining that an absolute value of the difference between the bank voltage signal and the service voltage signal is less than a delta voltage signal.

18. The switching control unit of claim 17 wherein the switch controller is further adapted to control the switching device to connect the at least one of the starter generator and the supercapacitor bank to the at least one of the service battery and the plurality of electrical devices in response to determining that the vehicle has come out of an engine start up.

19. The switching control unit of claim 16 wherein the switch controller is further adapted to control the switching device to disconnect the at least one of the starter generator and the supercapacitor bank from the at least one of the service battery and the plurality of electrical devices in response to determining that the absolute value of the difference between the bank voltage signal and the service voltage signal is greater than a delta voltage signal.

20. The switching control unit of claim 16 wherein the switch controller is further adapted to measure the current across the switching device to generate a switch current signal, to report a system failure in the event the switch current signal corresponds to a short circuit across the switching device and to disconnect the at least one of the starter generator and the supercapacitor bank from the at least one of the service battery and the plurality of electrical devices.

* * * * *

UNITED STATES PATENT AND TRADEMARK OFFICE
CERTIFICATE OF CORRECTION

PATENT NO. : 7,573,151 B2
APPLICATION NO. : 11/870753
DATED : August 11, 2009
INVENTOR(S) : Miguel Angel Acena et al.

It is certified that error appears in the above-identified patent and that said Letters Patent is hereby corrected as shown below:

Column 4, line 24: After "The switch controller" delete "72" and insert --22--.

Column 4, line 36: After "the service battery" delete "24" and insert --14--.

Column 7, line 9: After "the switching device" delete "20" and insert --24--.

Column 7, line 12: delete "(VSCAP - (VBAT) < deltaV" and insert --|VSCAP - VBAT| < deltaV--.

Column 7, line 23: After "the switching device" delete "20" and insert --24--.

Claim 5, column 8, line 49: After "is greater than" delete "the" and insert --a--.

Claim 11, column 9, line 25: After "by opening the" delete "switch" and insert --switching device--.

Claim 15, column 9, line 51: After "to determine if" delete "the at least one of the" and insert --an--.

Claim 19, column 10, line 42: After "to determining that" delete "the" and insert --an--.

Claim 20, column 10, line 49: After "a short circuit" insert --condition--.

Signed and Sealed this

Twenty-fourth Day of November, 2009

David J. Kappos
*Director of the United States Patent and Trademark Office*